United States Patent
Nagata

(10) Patent No.: US 10,332,491 B2
(45) Date of Patent: Jun. 25, 2019

(54) INSULATOR

(71) Applicant: G CLEF ACOUSTIC LTD., Ikeda-shi, Osaka (JP)

(72) Inventor: Ryoji Nagata, Ikeda (JP)

(73) Assignee: G CLEF ACOUSTIC LTD., Ikedashi, Osaka (JP)

( * ) Notice: Subject to any disclaimer, the term of this patent is extended or adjusted under 35 U.S.C. 154(b) by 0 days.

(21) Appl. No.: 16/089,416

(22) PCT Filed: Jul. 22, 2016

(86) PCT No.: PCT/JP2016/071489
§ 371 (c)(1),
(2) Date: Sep. 28, 2018

(87) PCT Pub. No.: WO2018/016063
PCT Pub. Date: Jan. 25, 2018

(65) Prior Publication Data
US 2019/0108817 A1    Apr. 11, 2019

(51) Int. Cl.
*F16F 13/00*    (2006.01)
*G10C 3/06*    (2006.01)
(Continued)

(52) U.S. Cl.
CPC ............... *G10C 3/06* (2013.01); *F16F 13/00* (2013.01); *F16F 15/022* (2013.01); *G10K 11/16* (2013.01)

(58) Field of Classification Search
CPC .......... G10C 3/06; F16F 13/00; F16F 15/022; G10K 11/16
See application file for complete search history.

(56) References Cited

U.S. PATENT DOCUMENTS

| 5,945,643 A * | 8/1999 | Casser | B29C 70/086 |
| | | | 181/208 |
| 2006/0045680 A1* | 3/2006 | d'Arc Lorenz | B65F 1/02 |
| | | | 414/408 |

FOREIGN PATENT DOCUMENTS

| JP | 62-200400 A | 9/1987 |
| JP | 2922928 B2 | 7/1999 |

(Continued)

OTHER PUBLICATIONS

International Search Report (PCT/ISA/210) dated Oct. 11, 2016, by the Japanese Patent Office as the International Searching Authority for International Application No. PCT/JP2016/071489.
(Continued)

*Primary Examiner* — Kimberly R Lockett
(74) *Attorney, Agent, or Firm* — Buchanan Ingersoll & Rooney PC

(57) ABSTRACT

An insulator is implemented such that a lower structure member to be brought into contact with a floor surface allows an upper structure member on which a piano is placed to be suspended through a cantilever spring member and a first wire, and a second wire connects the upper structure member and the lower structure member to each other in the horizontal direction, and the insulator thus functions so as to maintain intrinsic sound generated by the piano by free vibration in pendulum motion using the upper end of the first wire as a pivot, and richness of the sound is enhanced and transmission to a floor surface is inhibited, and, further, vibration caused by a key and a pedal being operated by a performer is reduced by elasticity of the cantilever spring member and the tensile force that acts on any of the second wires, and the performer does not feel uncomfortable with the operation.

12 Claims, 7 Drawing Sheets

(51) Int. Cl.
*F16F 15/02* (2006.01)
*G10K 11/16* (2006.01)

(56) References Cited

FOREIGN PATENT DOCUMENTS

| | | |
|---|---|---|
| JP | 2009-234443 A | 10/2009 |
| JP | 2011-027249 A | 2/2011 |
| JP | 5145310 B2 | 11/2012 |

OTHER PUBLICATIONS

Written Opinion (PCT/ISA/237) dated Oct. 11, 2016, by the Japanese Patent Office as the International Searching Authority for International Application No. PCT/JP2016/071489.
Audio Accessory No. 158 published in autumn in 2015 by Ongen Publishing Co., Ltd., 2015/10 issue, pp. 128 and 129.
Speaker Book 2016 by ONGAKUSHUPPANSHA Co., Ltd., 2016/7 issue, p. 192.
Extended European Search Report dated Mar. 29, 2019, issued by the European Patent Office in corresponding European Application No. 16909538.7. (7 pages).

\* cited by examiner

INSULATOR

TECHNICAL FIELD

The present invention relates to an insulator that is, for example, inserted between a piano and a floor surface, and that can improve sound of the piano and reduce vibration onto the floor surface.

BACKGROUND ART

The inventor of the present invention previously developed an insulator inserted and used mainly between a speaker and a floor surface, and obtained the patent for the insulator (see Patent Document 1). This allows a speaker to be substantially suspended by using a wire, and allows free vibration in pendulum motion due to the suspending structure using the wire to be utilized. Thus, a state in which the speaker is substantially suspended acoustically is realized, and sound intrinsic to the speaker can be reproduced without receiving influence from the floor surface.

"WELLFLOAT" is a registered trademark, and the application for the trademark was filed by the inventor of the present invention simultaneously when the application for the above-described patent was filed. Products which are sold with this trademark are very highly evaluated in the specialized field as indicated in, for example, Non-Patent Documents 1 and 2.

CITATION LIST

Patent Document

Patent Document 1: Japanese Patent No. 5145310

Non-Patent Document

Non-Patent Document 1: Audio Accessory No. 158 published in autumn in 2015 by ONGEN PUBLISHING CO., LTD., 2015/10 issue, pp. 128-129
Non-Patent Document 2: Speaker Book 2016 by ONGAKUSHUPPANSHA Co., Ltd., 2016/7 issue, p. 192

SUMMARY OF THE INVENTION

Problems to be Solved by the Invention

A piano, which is called the king of musical instrument, is used in a concert hall in the world and allows large audiences to enjoy its brilliant sound. In addition, pianos are being widespread to individual homes in recent years.

To date, a piano as a musical instrument has remained unchanged since the seventeenth century when a piano was invented in that a piano body, which is a heavy object, is placed directly on a floor surface and the piano is played.

As a result, there are few problems when a piano is used in a concert hall where measures against sound such as soundproof and sound insulating measures are sufficiently taken. However, for example, when pianos are used in individual homes, a problem often arises that measures against sound become insufficient due to various limitations. In particular, complaint about noise is often made in apartments and the like because measures for insulating adjacent homes and homes on upper and lower floors from sound are not sufficiently taken.

Furthermore, in the case of a grand piano which is relatively small and can be placed in an ordinary home, performers and the like are often discontent with even the grand piano because rich sound cannot be obtained due to limitation of the building being also added.

In consideration of such a situation, we want to use the above-introduced insulator, that is, an insulator for suspension using a wire. However, the following serious problem is likely to arise, and the insulator cannot be used as it is.

That is, in the case of a piano, a performer performs an operation of striking keys of the piano simultaneously when pressing a pedal with a foot, that is, performs an operation for playing the piano, so that sound is generated by the piano. If the above-described insulator is used as it is to put the piano into a suspended state, the piano itself oscillates due to the operation, and the performer feels significantly uncomfortable with the operation. Thus, naturally sensitive touch that is a so-called piano touch is degraded.

The present invention is made in order to solve the aforementioned problem, and provides an insulator that allows a performer to have little uncomfortability, reduces vibration onto a floor surface, and further enhances richness of sound.

Solution to the Problems

The insulator according to the present invention is an insulator that is disposed between a vibration generating object and a first flat surface, and that inhibits transmission of vibration between the vibration generating object and the first flat surface, and the insulator includes: a lower structure member to be brought into contact with the first flat surface; a cantilever spring member formed from a bent plate member, the cantilever spring member having one end attached to the lower structure member; a first wire having an upper end attached to the other end of the cantilever spring member; an upper structure member having an upper surface on which the vibration generating object is placed, the upper structure member attached to a lower end of the first wire, the upper structure member suspended from the lower structure member through the cantilever spring member and the first wire; and three or more second wires connecting the upper structure member and the lower structure member to each other in a horizontal direction, the three or more second wires being radially disposed so as to be equally spaced from each other in a circumferential direction such that a load point set at a center position of each of the upper structure member and the lower structure member is an axial center.

Effect of the Invention

As described above, the insulator according to the present invention functions so as to maintain a vibration energy component that is generated from a vibration generating object and that has a relatively high frequency, by free vibration in pendulum motion using the upper end of the first wire as a pivot. Therefore, richness of sound of the vibration energy component is enhanced, and transmission to the first flat surface is inhibited.

Furthermore, as to a vibration energy component that is generated from a vibration generating object and that has a relatively low frequency, the insulator functions so as to reduce a vertical component of the vibration energy component by elasticity of the cantilever spring member, and to reduce a horizontal component of the vibration energy component by tensile force that acts on any of the second wires. Therefore, vibration of the vibration generating object

DESCRIPTION OF EMBODIMENTS

Embodiment 1

Figure 1:
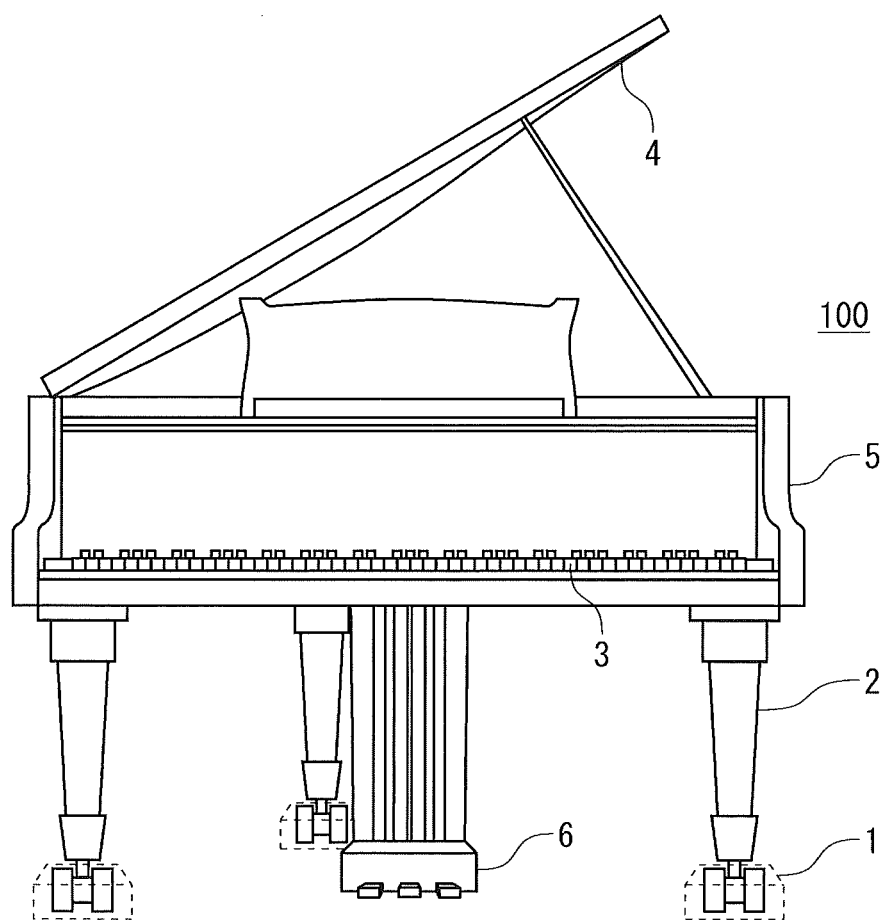
FIG. 1 illustrates an insulator 1, according to embodiment 1 of the present invention, which is applied to a piano.

FIG. 1 illustrates an insulator 1, according to embodiment 1 of the present invention, which is applied to a piano, and illustrates, by a dashed line, a contour of the insulator 1 so as to clarify the lower end of a leg 2 of the piano.

In FIG. 1, the three insulators 1 in total are generally used for the three legs 2, respectively, so as to be applicable to a so-called grand piano 100, so that one insulator 1 is used for one leg 2.

A case where the present invention is applied to the grand piano will be described below. However, the present invention is applicable similarly to a so-called upright piano, a so-called plucked string instrument such as a cembalo and a harpsichord, and, further, various musical instruments, such as an electronic piano, which generate sound by operation of keys and pedals although the number of legs vary, and a similar effect can be obtained. Further, for example, the present invention is applicable to a musical instrument, such as a cello, which is placed directly on a floor surface, and which generates sound as a musical instrument by a performer performing bowing and which also has a main body to which an external force is applied.

Furthermore, in embodiment 1, a first flat surface recited in claim 1 of the present invention is a floor surface, and the insulator 1 is placed between the floor surface and the leg 2 of the piano. Therefore, it is advantageous that work on the present piano itself is not necessary at all.

A mechanism of the piano will be briefly described with reference to FIG. 1. When a performer, who is seated in a chair on the front side in the drawing, strikes keys 3 with fingers of the hand of the performer, the force is transmitted to a hammer through a mechanism called an action having a lever combined therewith, and strings are struck by the hammer to generate sound.

Furthermore, vibration of the strings is transmitted to a sounding board through a component called a bridge, and vibration is amplified by the sounding board, so that a so-called piano sound is perceived by the surrounding audience.

The sound and vibration, which are generated by the sounding board and are perceived by the audience, have frequencies that are not lower than the lower limit value of human audio frequencies. In the present invention, this is referred to as a first vibration energy component.

The first vibration energy component reaches the audience directly or through a soundboard 4, and a part thereof reaches a floor surface through a frame 5 and the leg 2 of the piano.

Therefore, as in conventional art, in a case where a piano having a weight of several hundred kgs is placed directly on the floor surface, a part of the first vibration energy component is also absorbed into the floor.

Meanwhile, a pedal 6 generally includes three pedals which are left, right, and center pedals, and a performer presses and operates the pedals with a foot, for an effect intended by the performer, in order to loose, extend, or halt acoustic sound.

Operations of the keys 3 and the pedal 6 are performed by a performer as described above, for intended purposes, respectively. However, a vibration component for oscillating the piano in a certain direction is simultaneously generated.

A frequency of the vibration component is very low, and the frequency itself is outside a range audible to ears of a person, that is, the frequency is a frequency less than the lower limit value of human audio frequencies, and the frequency is referred to as a second vibration energy component in the present invention. However, in a case where a piano, which is a heavy object, is placed directly on a floor surface as in conventional art, the piano rarely oscillates by the key 3 and the pedal 6 being operated by the performer, and the performer does not feel uncomfortable at all.

As described above, in a case where the insulator which was already developed by us is applied as it is as shown in FIG. 1 in order to eliminate leakage, to the floor, of the first vibration energy component generated by the soundboard of the piano, and to allow the entirety of the energy component to reach the audience, loss of the generated first vibration energy component is certainly prevented, and, accordingly, sound of the piano becomes rich. However, the piano itself is oscillated by the above-described second vibration energy component, that is, by the key 3 and the pedal 6 being operated by the performer, resulting in the performer feeling significantly uncomfortable with the operation for performance as described above in the problems to be solved by the present invention.

The present invention has been achieved as a result of production of various samples on the basis of the insulator, for suspending structure using a wire, of which the patent was previously obtained as our patent, such that the first vibration energy component of sound intrinsic to a piano is maintained so as to minimize loss of the first vibration energy component, and the second vibration energy component caused by the key 3 and the pedal 6 being operated is minimized.

Figure 2:
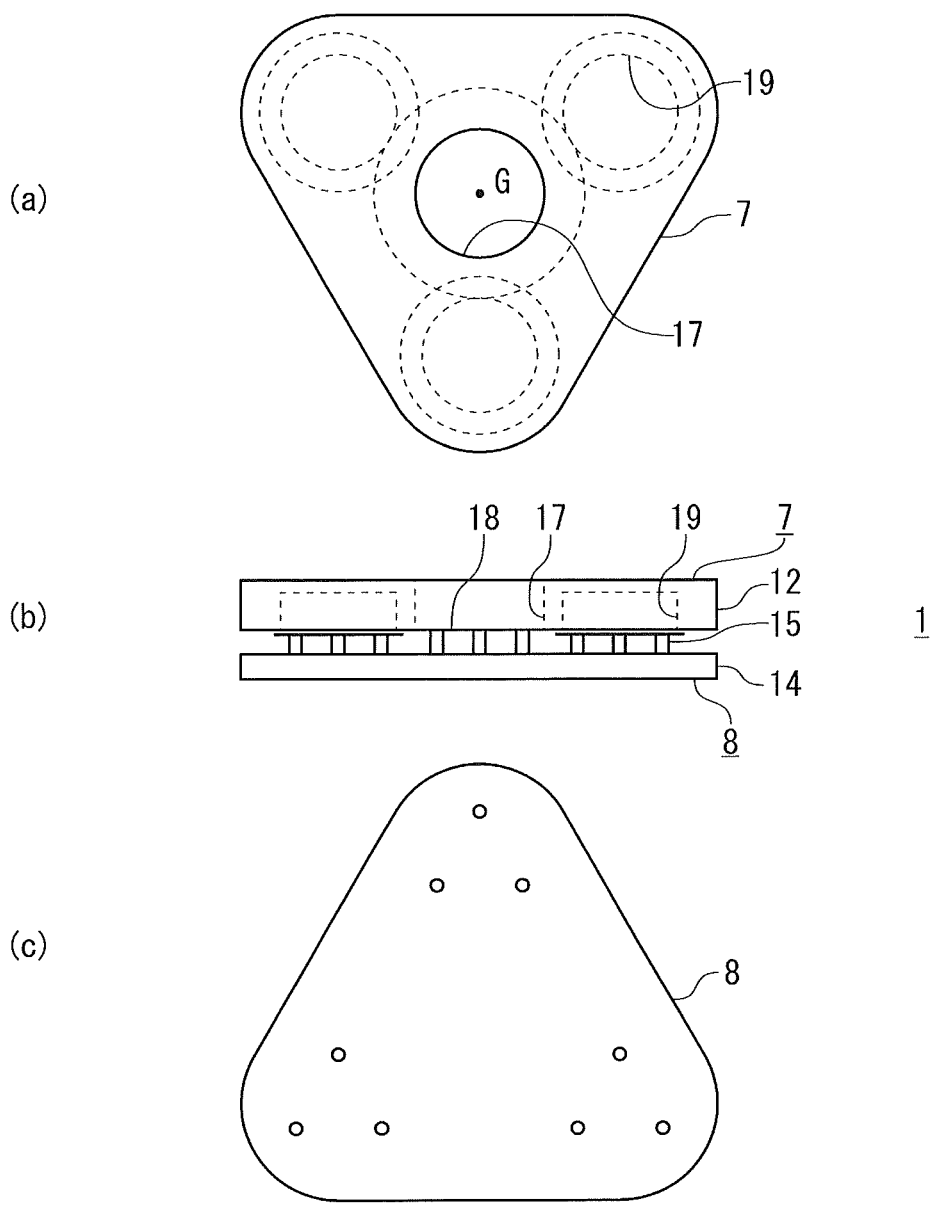
FIG. 2 illustrates the entire structure of the insulator 1.

A structure of the insulator 1 according to embodiment 1 of the present invention will be described below in detail. FIG. 2 illustrates the entirety of the insulator 1, FIG. 2(a) is a top view thereof, FIG. 2(b) is a side view thereof, and FIG. 2(c) is a rear view thereof.

The insulator 1 generally includes an upper structure member 7 and a lower structure member 8, and further includes a cantilever spring member 9, a first wire 10, and a second wire 11, which are not shown in FIG. 2 even as dashed lines and will be described with reference to the subsequent drawings.

Figure 3:
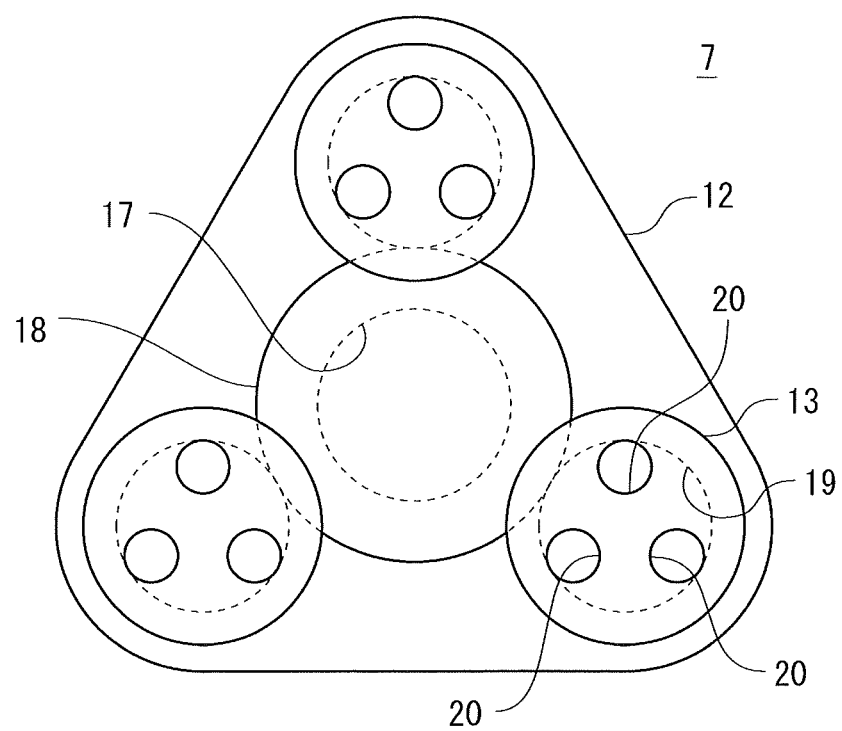
FIG. 3 is a rear view of an upper structure member 7 shown in FIG. 2.
Figure 4:
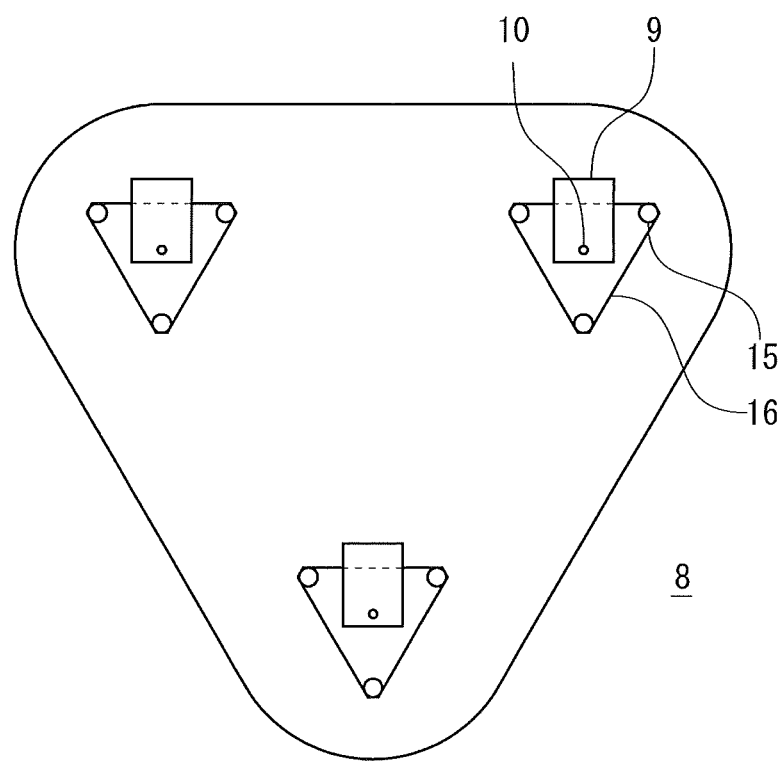
FIG. 4 is a top view of a lower structure member 8 shown in FIG. 2.

FIG. 3 is a rear view of the upper structure member 7. FIG. 4 is a top view of the lower structure member 8. On the upper structure member 7, the piano 100 is placed. The upper structure member 7 includes: an upper member 12 which is formed by, for example, a laminated plate having a thickness of about 30 mm being shaped as shown in the drawing; and a lower member 13 shown in FIG. 3. The lower structure member 8 is placed on a floor surface, and allows the upper structure member 7 to be suspended through the cantilever spring member 9 and the first wire 10 as described below in detail. Similarly, the lower structure member 8 includes: a bottom plate part 14 formed by, for example, a laminated plate having a thickness of about 15 mm being shaped as shown in the drawing; support columns 15 shown in FIG. 2(b) and FIG. 4; and spring seats 16 shown in FIG. 4.

As shown in FIG. 3, each lower member 13 has insertion holes 20 into which the support columns 15 are inserted.

The upper member 12 has, at the center position that is a load point G, a first recess 17 which is opened upward and in which the lower end of the leg 2 of the piano is accommodated. In the present embodiment, a hole penetrates through the laminated plate, and a bottom plate 18 that closes the hole from the rear surface is attached by screws as shown in FIG. 3 in consideration of workability. However, a hole may be formed in the laminated plate so as to be shorter than the thickness of the laminated plate, thereby forming a bottomed structure.

Furthermore, three second recesses 19 are formed at positions that are equally spaced from each other on the circumference formed by the load point G at the center of the upper member 12 being the axial center. The three second recesses 19 are each opened downward so as to accommodate the cantilever spring member 9 and the first wire 10 described below.

FIG. 4 partially shows: the cantilever spring member 9 fixed to the spring seat 16; and the first wire 10 attached to the cantilever spring member 9. The mechanism of the suspending structure will be described in detail with reference to FIG. 5 showing the structure in an enlarged manner.

Figure 5:
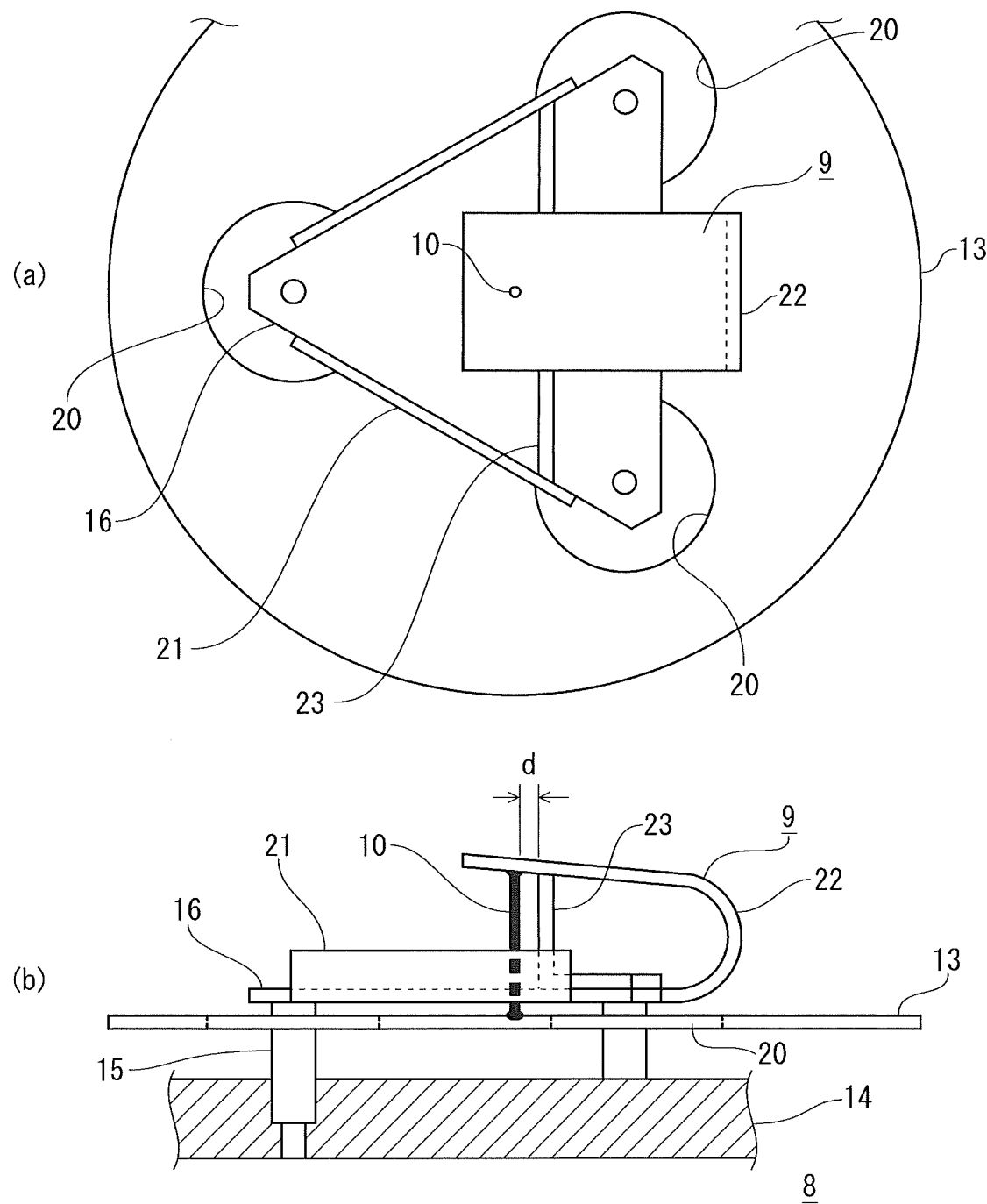
FIG. 5 illustrates a suspending structure portion associated with a single first wire 10.

FIG. 5 shows a suspending structure portion associated with one first wire 10. Therefore, one insulator 1 has the three suspending structures. FIG. 5(a) is a top view thereof. FIG. 5(b) is a side view thereof.

In FIG. 5, the support columns 15 are fitted into the bottom plate part 14 of the lower structure member 8, and fixed thereto by male screws (not shown) being inserted and screwed from the back surface of the bottom plate part 14 into female screws (not shown) formed in the support columns 15. The support columns 15 penetrate through the insertion holes 20 formed in the lower member 13, and the spring seat 16 is attached to the upper ends of the support columns 15 by screws.

In this example, as shown in FIG. 5(b), the spring seat 16 has a reinforcing wall 21 and a U-shaped part 22, which forms a part of the cantilever spring member 9, integrated with each other by the spring seat 16 itself being bent.

An L-shaped part 23 is formed such that the horizontal portion thereof is overlaid on the spring seat 16 and attached to the upper end of the support column 15 by screws, and the upper end of the vertical portion contacts with the U-shaped part 22, as shown in FIG. 5(b). The upper end and the lower end of the first wire 10 are attached to a portion near the end of the U-shaped part 22, and the lower member 13, respectively.

The U-shaped part 22 and the L-shaped part 23 form the cantilever spring member 9, and load of the piano 100 which is applied through the first wire 10 and the lower member 13 of the upper structure member 7, is supported by the cantilever spring having a span d.

The second vibration energy component described above, that is, a vertical component, of vibration energy, which has a frequency that is less than the lower limit value of human audio frequency and which is caused by the key 3 and the pedal 6 being operated by a performer is reduced by elasticity of the cantilever spring member 9.

Figure 6:
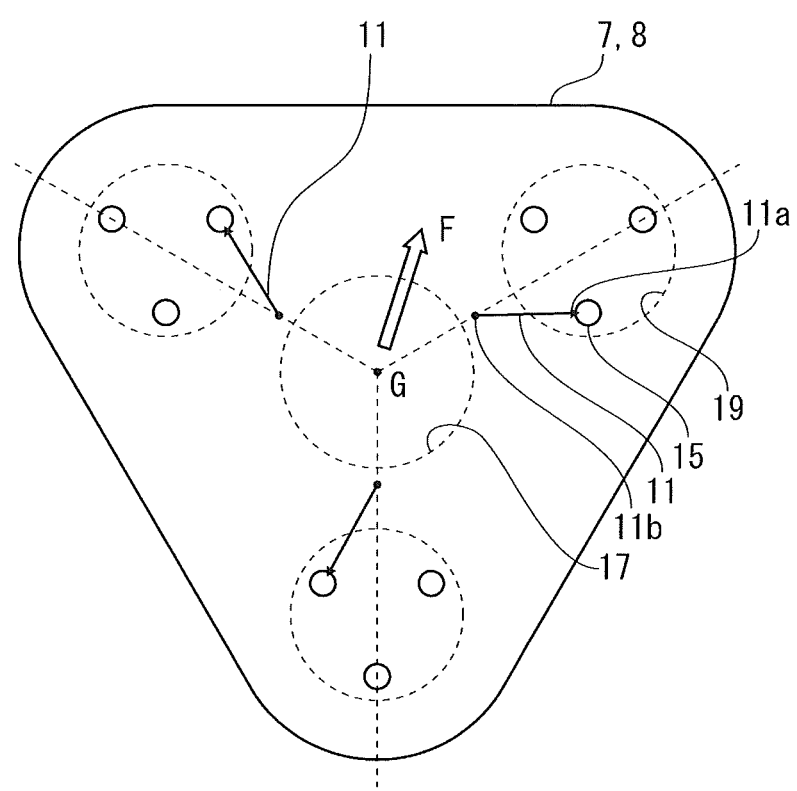
FIG. 6 illustrates a structure of attaching a second wire 11.

Next, a structure for attaching the second wire 11 will be described with reference to FIG. 6. FIG. 6 shows the insulator 1 from thereabove, and allows the structure for attaching the second wire 11 to be easily viewed by the components described above being viewed in a see-through manner as appropriate.

The second wire 11 connects the upper structure member 7 and the lower structure member 8 to each other in the horizontal direction in order to reduce a horizontal component of the second vibration energy component described above.

Specifically, for example, as shown in FIG. 6, one end 11a of the second wire 11 is attached to the support column 15 fixed to the lower structure member 8, and the other end 11b of the second wire 11 is fixed to a portion of the first recess 17 formed in the upper member 12 of the upper structure member 7.

In practice, the greatest effort has been made and a lot of samples have been repeatedly produced for means for reducing the horizontal component of the second vibration energy component, in order to complete the present invention.

That is, samples for connection with partial use of a rubber member, connection using a thin aluminium plate, connection through a partially formed gap, and the like were produced so as to change dimensions and shapes, and sound was verified as piano sound, and uncomfortability due to operation by a performer was verified. However, both requirements were not satisfied by any of the samples.

The connection structure, using the second wire 11, shown in FIG. 6 was obtained as a result of trial and error, and, by the connection structure, a so-called suspending structure, disclosed in Patent Document 1, which was previously developed by the inventor of the present invention allows richness of sound of a piano to be enhanced, inhibits transmission onto a floor surface, and allows an operating performer to have little uncomfortability as in the conventional art, as described below.

Specifically, the second wire 11 is formed from a strand obtained by a plurality of narrow wires being stranded, and crimp terminals are attached to both ends thereof, and are fixed to the respective portions. In FIG. 6, the one end 11a is fixed to a portion of the support column 15 of the lower structure member 8, and the other end 11b is fixed to a portion of the first recess 17 of the upper structure member 7, specifically, to a terminal provided at a peripheral portion of the first recess 17 of the upper member 12.

The position at which the second wire 11 is attached is not necessarily limited to the position shown in FIG. 6. However, it is proved as a result of various experiments that the following conditions need to be satisfied.

That is, the second wire 11 connects the upper structure member 7 and the lower structure member 8 to each other in the horizontal direction, and three or more second wires 11 are radially disposed so as to be equally spaced from each other in the circumferential direction such that the load point G set at the center position of each of the upper structure member 7 and the lower structure member 8 is the axial center.

It has been proved that, in a case where at least the above-described conditions are satisfied, when the horizontal component of the above-described second vibration energy component caused by the key 3 and the pedal 6 being operated by a performer acts on each insulator in any direction within a range of the horizontal direction, for example, in the direction indicated by F in FIG. 6, the force F is reduced by tensile force that acts on any one, some, or all of the second wires 11.

As described above, in consideration of a case where force acts in any direction, the second wire 11 is formed from the strand as described above. Thus, in particular, the end portions thereof are flexibly bent according to a direction of force, and the second wires 11 assuredly share tensile force.

In FIG. 6, the above-described conditions are satisfied, and, further, the second wire 11 is attached so as to be tilted by about 30 degrees from a straight line, as indicated by a dashed line, which passes through the load point G. This structure is adopted in consideration of a result, of listening test, indicating that sound of a piano is further improved as compared to a case where the second wire 11 is disposed on the straight line in the drawing.

The aforementioned first wire 10 that is shown in FIG. 5 is similar to that introduced in Patent Document 1, and is described in detail in the document, and the outline thereof will be simply described. The first wire 10 is formed from a strand obtained by a plurality of narrow wires being stranded, similarly to the second wire 11, and the natural vibration frequency of free vibration in pendulum motion is set as, for example, about 3.57 Hz, and, accordingly, the length of the wire is set as 20 mm.

When the first wire 10 used in a vertical orientation is formed from a strand, in particular, deformation at both end portions thereof in the horizontal direction is more assuredly obtained, and an effect of the pendulum motion being more assuredly and smoothly performed is obtained.

In a mechanism of transmitting the first vibration energy component generated from a soundboard of the piano, to the leg 2, further, to a floor surface, since the frequency is very high, a lot of frequency components are included, and an amplitude is very small, it is likely to be extremely difficult to measure an amount of the transmission and the transmission mechanism itself by a measurement instrument.

Furthermore, it is difficult to take into consideration the notion of transmission of vibration in the lateral direction and transmission of vibration in the vertical direction, which can be assumed at low frequency. The inventor of the present invention has concluded that, as a result of various experiments mainly based on human audibility, in particular, the first vibration energy component is appropriately grasped in the form of energy.

Specifically, a result has been obtained such that, if the cantilever spring member 9 is not used or a spring having both ends supported is used, an intended sound effect cannot be obtained, and, when the first wire 10 is formed from a strand, sound effect is improved. Thus, it is assumed that transformation occurs such that energy of the first vibration energy component that has been transmitted in the leg 2 in a very complicated manner in practice can be efficiently absorbed by pendulum motion due to action of the first wire 10 and the cantilever spring member 9, that is, the first vibration energy component can be maintained without attenuating energy.

Next, a result of verification for the insulator 1 having the structure described above will be described.

Firstly, in the first verification, whether or not the first vibration energy component can be maintained, without losing the first vibration energy component, by free vibration in pendulum motion by the suspending structure being realized, as developed in Patent Document 1 described above, also in a state where the upper structure member 7 and the lower structure member 8 are connected and held by the second wire 11 as described above, is determined.

The inventor of the present invention has developed a verification method in which highly sensitive human audibility is utilized and high objectivity can be obtained in consideration of an actual situation in which the sound characteristics cannot be obtained in a mechanical method such as waveform analysis or frequency analysis at all, as introduced in Patent Document 1 described above.

The insulator 1 according to the present invention is applied to a piano. Needless to say, finally, the present invention was applied to a piano and the sound of the piano was evaluated. However, in order to apply the objective verification method having been previously developed, a sound source capable of accurately repeating reproduction is needed. Therefore, the insulator 1 having been completed was inserted between a speaker and a floor surface, and sound reproduced by a CD as a sound source was used, to perform verification in the same method as previously developed.

A speaker having a weight close to a weight of one leg of a piano was used as the speaker. As a result, the condition for this verification is different from the condition for the previously developed verification in that the upper structure member 7 and the lower structure member 8 are connected and held by the second wire 11 in this verification.

The verification method is described in detail in the document, and all the contents thereof are not described again herein. The features will be listed as below.

(1) As a sensor for detecting reproduced sound, ears of a person are used in particular, to assuredly obtain high detection sensitivity that cannot be obtained in a method such as waveform analysis or frequency analysis at all.

(2) When two sounds having different pitches (sound pitch=sound frequency), respectively, are simultaneously generated, a phenomenon that beats (beating) are perceived by ears of a person in some cases and beats are not perceived by ears of a person in other cases due to relationship between the pitches (frequencies) of the two sounds, is observed. In the developed method, sound is not subjectively grasped as, for example, soft sound, hard sound, bright sound, or dark sound as generally expressed, and objectivity of the verification is enhanced by focusing on the phenomenon that beats or no beats occur, depending on cases as described above.

(3) As a reference instrument used for comparison with the experiment using the speaker, high performance headphones which are not influenced by the insulator 1 are used to assure reliability of the comparison result.

Also in the method described herein, a CD, in which sounds of performance by pianos that were tuned in different tuning methods, respectively, were recorded, was used, reproduced sound from the speaker and reproduced sound perceived through the headphones without using a speaker are heard with ears of a person, whereby whether or not beats occurred was determined.

As a result, when the second wire 11 was used in the structure described above with reference to FIG. 6 and the like, almost the same data as in Patent Document 1 was obtained. That is, it has been proved that, although the upper structure member 7 and the lower structure member 8 are connected and held by the second wire 11, the speaker is acoustically suspended, in other words, the first vibration energy component is maintained by free vibration in pendulum motion by the suspending structure using the first wire 10 and the cantilever spring member 9. In any of various methods that were variously attempted in trial and error until completion of the present invention as introduced above, the result was not satisfactory.

It is considered that the method is different from other methods in that holding, in the horizontal direction, by the second wire 11 that connects the upper structure member 7 and the lower structure member 8 to each other causes a holding state by tensile force of the wire, and a desired result has been thus obtained. As described with reference to FIG. 6, the force F, in the horizontal direction, of the second vibration energy component can be applied in any direction in the insulator 1. Therefore, in order to constantly reduce the force F by tensile force that acts on the wire, three or more second wires 11 need to be radially disposed so as to be equally spaced from each other in the circumferential direction.

Next, in the second verification, verification is performed for uncomfortability of a performer due to the second vibration energy component caused by the key 3 and the pedal 6 being operated by the performer.

The second vibration energy component has a very low frequency, and whether or not the piano moves according to the component can be felt by directly touching the frame 5 or the leg 2 of the piano with a hand. Furthermore, discrimination between the vertical component and the horizontal component is not impossible.

In the present invention, the vertical component of the second vibration energy component is reduced by elasticity (stiffness) of the cantilever spring member 9. As described above with reference to FIG. 5, the U-shaped part 22 and the L-shaped part 23 are combined to form the cantilever spring member 9, whereby stiffness is made sufficient so as to correspond to the weight of the piano, and displacement is reduced so as to be ignored.

As to the horizontal component of the second vibration energy component, displacement is reduced to such a degree that a performer rarely feels uncomfortable, due to tensile force applied to the three or more (three in FIG. 6) second wires 11 as shown in FIG. 6 and as described above in detail.

The verification was conducted by inspectors. The inspectors were a plurality of persons who had worked as piano teachers and tuners for many years.

The uncomfortability caused by operation of the piano can be relatively clearly perceived. For example, in the method, among various methods which were variously attempted in trial and error until completion of the present invention, in which the upper structure member 7 and the lower structure member 8 were connected by a thin aluminium plate, as introduced above, although the uncomfortability was overcome, acoustic sound was not good. As a result of various trial methods being conducted, it was confirmed by all the inspectors that the product of the present invention was sufficiently satisfactory in both sound and comfortability.

As described above, the insulator 1 according to embodiment 1 of the present invention includes: the upper structure member 7 on which the lower end of the leg 2 of the piano is placed; and the lower structure member 8 that is placed on a floor surface and allows the upper structure member 7 to be suspended through the cantilever spring member 9 and the first wire 10, and the insulator 1 allows the second wire 11 to connect the upper structure member 7 and the lower structure member 8 to each other in the horizontal direction. Therefore, the insulator 1 functions such that the first vibration energy component corresponding to intrinsic sound generated by the piano is maintained by free vibration in pendulum motion using the upper end of the first wire 10 as a pivot, and, therefore, richness of sound due to the vibration energy component is enhanced and transmission onto a floor surface is inhibited, as compared to a conventional case in which placement is performed directly on a floor surface.

Furthermore, the vertical component of the second vibration energy component due to the key 3 and the pedal 6 being operated by a performer is reduced by elasticity of the cantilever spring member 9, and the horizontal component of the second vibration energy component is reduced by tensile force that acts on any of the second wires 11, whereby the performer does not feel uncomfortable with the operation.

Embodiment 2

Figure 7:
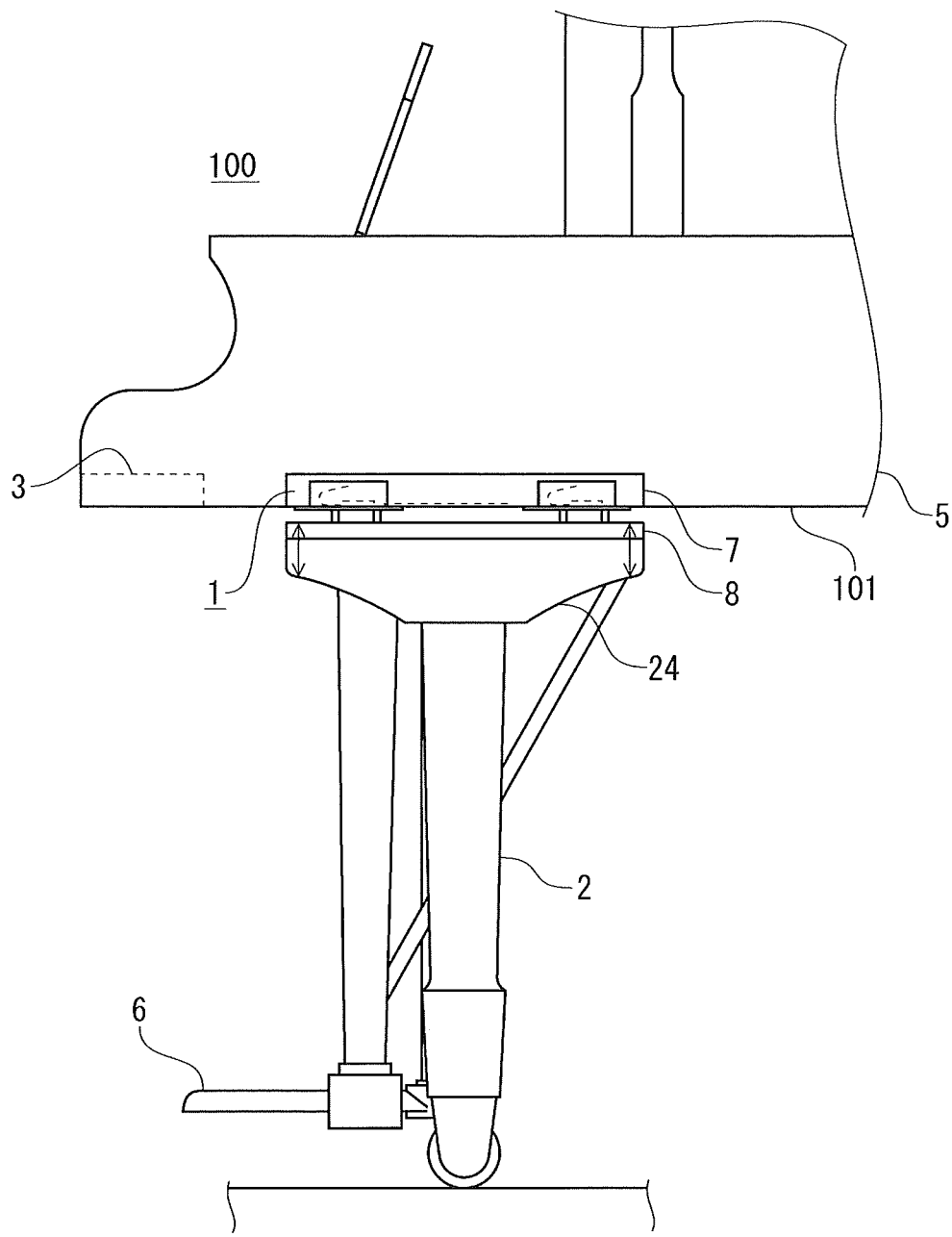
FIG. 7 illustrates an insulator 1, according to embodiment 2 of the present invention, which is incorporated into a piano itself.

FIG. 7 shows the insulator 1 according to embodiment 2 of the present invention. The insulator 1 of embodiment 2 is substantially the same as that of embodiment 1 described above. However, embodiment 2 is different from embodiment 1 in that the insulator 1 is incorporated into the leg 2 itself of the piano in embodiment 2. In other words, in embodiment 2, the first flat surface according to claim 1 of the present invention is the upper surface of an upper attachment portion 24, described below, of the leg 2, and the lower structure member 8 is fixed to the upper attachment portion 24, to integrate the insulator 1 and the leg 2 with each other. The piano 100 includes the legs 2 and a piano body 101 other than the legs 2.

Hereinafter, difference from embodiment 1 described above will be mainly described.

In a case where a piano is transported to a setting place such as a concert hall or an individual home, the legs 2 and the piano body 101 are separately transported in order to reduce dimensions of the package or in order to prevent unbearable force from being applied to the leg 2. After unpackaged at the setting place, the legs 2 are attached to the piano body 101, and the piano is moved in the setting place mainly by rolling wheels mounted at the lower ends of the legs 2.

Therefore, it is advantageous for a piano manufacturer that, in a case where the insulator 1 of the present invention is incorporated into the leg 2, the insulator 1 is incorporated in this state when the leg 2 that has been separately transported is attached to the piano body 101 at the setting place, as in an ordinary operation procedure, and the movement in the setting place can be also performed in the same manner as in conventional art.

In FIG. 7, the upper attachment portion 24 is a member that is originally provided in a portion where the leg 2 is attached to the piano body 101, and is attached to an attachment surface formed in the frame 5 by using screws.

In embodiment 2, the lower structure member 8 of the insulator 1 is attached to the upper surface of the upper attachment portion 24 by using screws and the like. The upper structure member 7 of the insulator 1 is attached to the above-described attachment surface formed in the frame 5 by using screws.

In embodiment 1 described above, the insulator 1 is structured such that three sets of the first wires 10 and the cantilever spring members 9 and the three second wires 11 are provided for one insulator 1, and the upper structure member 7 and the lower structure member 8 are each formed into an almost regular triangle in a planar view. In this case, specifically, in a case where the insulator 1 is structured to be integrally incorporated into the leg 2 of a piano, when it is convenient to form the insulator 1 into a quadrangular shape in view of the structural shape of the piano, four sets of the first wires 10 and the cantilever spring members 9 and the four second wires 11 may be provided to form a quadrangular shape.

As described above, the insulator 1 according to embodiment 2 of the present invention has, as an insulator itself, the same structure as described above in embodiment 1. Therefore, the insulator functions so as to maintain the first vibration energy component corresponding to intrinsic sound generated by a piano by free vibration in pendulum motion using the upper end of the first wire 10 as a pivot, whereby richness of sound due to the vibration energy component is enhanced and transmission onto a floor surface is also inhibited as compared to a conventional case.

Furthermore, a vertical component of the second vibration energy component caused by the key 3 and the pedal 6 being operated by a performer is reduced by elasticity of the cantilever spring member 9, and the horizontal component of the second vibration energy component is reduced by tensile force that acts on any of the second wires 11, and a performer does not feel uncomfortable with the operation.

Furthermore, the insulator 1 is integrally incorporated into the leg 2 in a structure where the lower structure member 8 is attached and fixed to the upper portion of the leg 2 of the piano, and the upper structure member 7 is detachably attached to the frame 5 of the piano, so that it is advantageous that a piano, which is a heavy object, can be simply transported or moved in the same manner as in a conventional manner.

In the above description, a plurality of sets of the cantilever spring members 9 and the first wires 10 are provided for one insulator 1. However, one set of the cantilever spring member 9 and the first wire 10 may be provided for one insulator 1 depending on, for example, the size and characteristics of a vibration generating object, or the necessary number of the insulators 1.

Furthermore, in the above description, the first vibration energy component having a frequency that is not less than the lower limit value of human audio frequency and the second vibration energy component having a frequency that is less than the lower limit value thereof are generated by the vibration generating object. However, the present invention may not be limited thereto. Also in a case where vibration energy component having a relatively high frequency and a vibration energy component having a relatively low frequency are generated, the length of the first wire 10 is, for example, adjusted according to the corresponding frequencies, whereby the present invention can be similarly applied and the same effect can be obtained.

In the present invention, the above embodiments may be freely combined with each other, or each of the above embodiments may be modified or abbreviated as appropriate within the scope of the present invention.

The invention claimed is:

1. An insulator that is disposed between a vibration generating object and a first flat surface, and that inhibits transmission of vibration between the vibration generating object and the first flat surface, the insulator comprising:
a lower structure member to be brought into contact with the first flat surface;
a cantilever spring member formed from a bent plate member, the cantilever spring member having one end attached to the lower structure member;
a first wire having an upper end attached to the other end of the cantilever spring member;
an upper structure member having an upper surface on which the vibration generating object is placed, the upper structure member attached to a lower end of the first wire, the upper structure member suspended from the lower structure member through the cantilever spring member and the first wire; and
three or more second wires connecting the upper structure member and the lower structure member to each other in a horizontal direction, the three or more second wires being radially disposed so as to be equally spaced from each other in a circumferential direction such that a load point set at a center position of each of the upper structure member and the lower structure member is an axial center.

2. The insulator according to claim 1, wherein
the vibration generating object generates a first vibration energy component having a frequency that is not lower than a lower limit value of a human audio frequency, and a second vibration energy component having a frequency lower than the lower limit value, and
the insulator functions to maintain the first vibration energy component by free vibration in pendulum motion using the upper end of the first wire as a pivot, functions to reduce a vertical component of the second vibration energy component by elasticity of the cantilever spring member, and functions to reduce a horizontal component of the second vibration energy component by tensile force that acts on any of the second wires.

3. The insulator according to claim 2, wherein
the vibration generating object has a plurality of legs, and one insulator is disposed for each leg between the leg of the vibration generating object and a floor surface that is the first flat surface,
in each insulator, the upper structure member has an upper member and a lower member,
the upper member has, at the center position, a first recess that is opened upward so as to accommodate a lower end of the leg, and has three second recesses that are formed at positions equally spaced from each other on a circumference such that the load point is an axial center, and that are opened downward so as to accommodate the cantilever spring member and the first wire,
the lower member is provided for each second recess, is connected to the lower end of the first wire, and is attached to the upper member so as to close the second recess,
the lower structure member includes a bottom plate portion to be brought into contact with the floor surface, a support column having a lower end fixed to the bottom plate portion at a position corresponding to each lower member, and a spring seat that is fixed to an upper end of the support column and that fixes the one end of the cantilever spring member,
three sets of the cantilever spring members and the first wires in total are provided so as to correspond to the lower members, and
each second wire connects between a portion of the first recess of the upper structure member and a portion of the support column of the lower structure member.

4. The insulator according to claim 3, wherein
the vibration generating object is a piano that includes a key, a soundboard, a pedal, and the leg,
the first vibration energy component is a vibration energy component that is generated through the soundboard according to the key and the pedal being operated by a performer, and that is associated with sound that reaches the leg, and further reaches the insulator,
the second vibration energy component is a vibration energy component that reaches the leg, and further reaches the insulator without propagating through the soundboard according to the key and the pedal being operated by the performer.

5. The insulator according to claim 2, wherein
a main body of the vibration generating object, and a plurality of legs are provided,
the plurality of legs have an upper attachment portion that is detachably attached to the main body, and have lower ends to be brought into contact with a floor surface,
the insulator is disposed between the main body, and the upper attachment portion having an upper surface that serves as the first flat surface, and the insulator is integrally incorporated into the leg,
in each insulator, the upper structure member has an upper member and a lower member,
the upper member has three second recesses that are formed at positions equally spaced from each other on a circumference such that the load point is an axial center, and that are opened downward so as to accommodate the cantilever spring member and the first wire, and the upper member is detachably attached to the main body,
the lower member is provided for each second recess, is connected to the lower end of the first wire, and is attached to the upper member so as to close the second recess,
the lower structure member includes a bottom plate portion attached to the upper attachment portion of the legs, a support column having a lower end fixed to the bottom plate portion at a position corresponding to each lower member, and a spring seat that is fixed to an upper end of the support column and that fixes the one end of the cantilever spring member,
three sets of the cantilever spring members and the first wires in total are provided so as to correspond to the lower members, and
each second wire connects between a portion on a circumference formed by the load point of the upper structure member being an axial center, and a portion of the support column of the lower structure member.

6. The insulator according to claim 5, wherein
the main body is a piano body that includes a key, a soundboard, and a pedal,
the piano body and the legs form a piano,
the first vibration energy component is a vibration energy component that is generated through the soundboard according to the key and the pedal being operated by a performer, and that is associated with sound that reaches the insulator, and
the second vibration energy component is a vibration energy component that reaches the insulator without propagating through the soundboard according to the key and the pedal being operated by the performer.

7. The insulator according to claim 1, wherein the first wire and the second wire are each a strand formed by a plurality of narrow wires being stranded.

8. The insulator according to claim 2, wherein the first wire and the second wire are each a strand formed by a plurality of narrow wires being stranded.

9. The insulator according to claim 3, wherein the first wire and the second wire are each a strand formed by a plurality of narrow wires being stranded.

10. The insulator according to claim 4, wherein the first wire and the second wire are each a strand formed by a plurality of narrow wires being stranded.

11. The insulator according to claim 5, wherein the first wire and the second wire are each a strand formed by a plurality of narrow wires being stranded.

12. The insulator according to claim 6, wherein the first wire and the second wire are each a strand formed by a plurality of narrow wires being stranded.

* * * * *